July 6, 1965  KEIJI TSUJIHATA ETAL  3,193,271
BLAST CONTROLLING DEVICE FOR BLAST FURNACES
Filed Jan. 15, 1962  6 Sheets-Sheet 1

INVENTORS
Keiji Tsujihata
Yasuhiro Sawada
BY
Wenderoth, Lind & Ponack,
attorneys

A - A'

INVENTORS
Keiji Tsujihata
BY Yasuhiro Sawada

F I G. 7
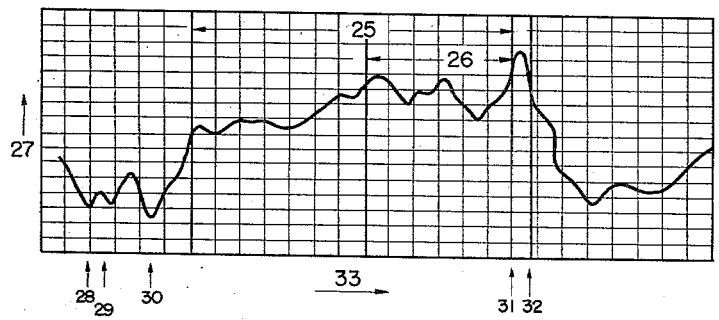
F I G. 8
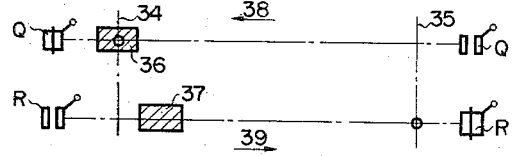
F I G. 9
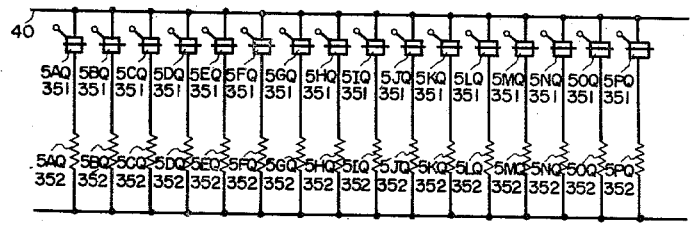
F I G. 10
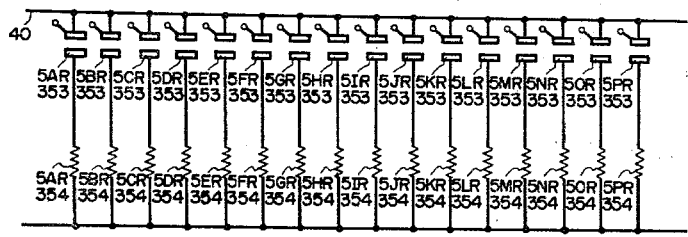
INVENTORS
Keiji Tsujihata
Yasuhiro Sawada
BY Wenderoth, Lind & Ponack
attorneys

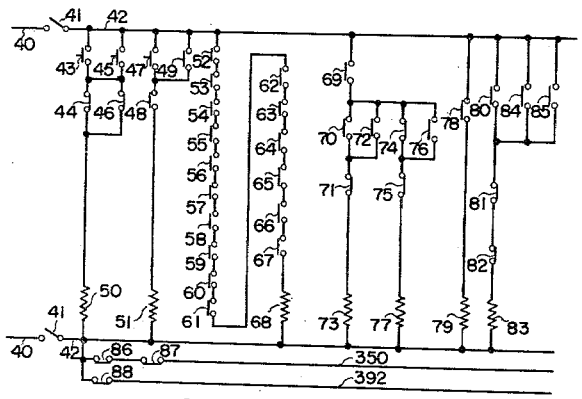
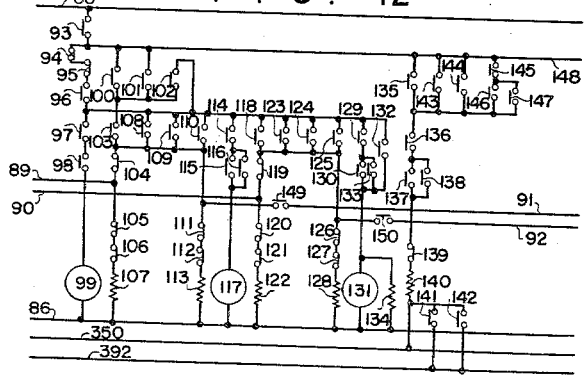
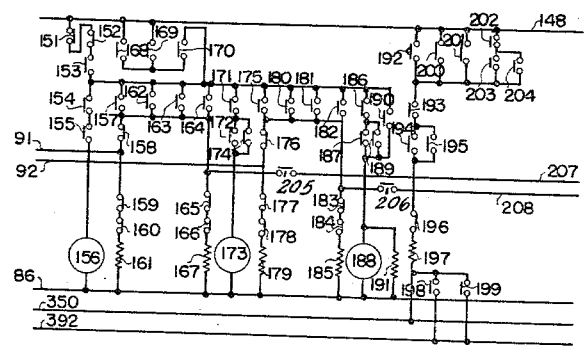

3,193,271
BLAST CONTROLLING DEVICE FOR
BLAST FURNACES
Keiji Tsujihata, Yawata, Fukuoka Prefecture, and Yasuhiro Sawada, Kokura, Japan, assignors to Yawata Iron & Steel Co., Ltd., Tokyo, Japan, a corporation of Japan
Filed Jan. 15, 1962, Ser. No. 166,014
Claims priority, application Japan, Jan. 20, 1961,
36/1,916
5 Claims. (Cl. 266—30)

This invention relates to a pulsating blast controlling device for blast furnaces.

In the conventional blast furnace operation, because the blasts are blown in only through tuyeres, the conditions within the furnace in front of the respective tuyeres will often be different due to the non-uniformity of the distribution of the blasts or the unbalance of the reaction within the furnace and the amount of the blast through each conventional tuyere will be likely to become non-uniform. Thus, not only will the efficiency of the operation of the blast furnace be reduced but also local damage will be caused to the furnace breast bricks. Further, the parts of the interior of the furnace between the respective conventional tuyeres will become dead spaces into which insufficient oxygen will penetrate and a part of the coke therein will remain unburned. When such conditions occur, the fluidity of the slag and pig-iron will be impaired. Thus, the quality of the product will be reduced.

Making the flow through the tuyere uniform is usually so important to the increase of the efficiency of the operation of the blast furnace and to the prevention of local damage to the furnace bricks that it is being studied in various countries. For example, in the Gary iron manufacturing plant of U.S. Steel Company, research is being carried out to control the flow through the conventional tuyere by itself by setting a valve in the tuyere. However, such method is a matter of common sense. It is considered natural to close tuyeres in which there is high flow and to open tuyeres where there is a low flow. Further, the defect in such a method is that it is necessary that the amount of the blast should be variable within limits. Therefore, the operation can not be carried on with the valve fully open. Further, in a tuyere in which the flow has decreased even though the valve is fully opened, the influence on the furnace will be so small that it will not improve the conditions in the furnace.

The present invention is for the purpose of eliminating the above mentioned defects and relates to a blast controlling device for blast furnaces wherein auxiliary tuyeres are provided near ordinary tuyeres and the blast through said auxiliary tuyere is made to pulsate at a required frequency by the operation of the controlling device so that oxygen will penetrate the part of the dead space between the respective ordinary tuyeres and the velocity of the reducing reaction can be increased and so that, when it is selectively made to pulsate, the blast or pressure through each ordinary tuyere can be maintained within a required set range.

Because an auxiliary tuyere is provided between the conventional ordinary tuyeres and the blast through the auxiliary tuyere is made to pulsate at a required frequency by the pulsating valve of said tuyere through the valve opening and closing means, the gas which has entered cracks in the ore will be replaced by fresh gas due to the pulsation, the reducing reaction of the ore will be accelerated and sufficient oxygen will be fed so that it will penetrate even the dead space between the ordinary tuyeres. Further, the blast through the auxiliary tuyere is selectively made to pulsate so that the flow of the blast through each ordinary tuyere can be uniform or, for example, the flow or pressure at each ordinary tuyere can always be maintained within a predetermined required range for the average of measured values thereof as detected by a known method.

The object of the present invention is to obtain a uniform distribution of the flow of blast gases along the inner periphery of the blast furnace, by supplementing the flow through the ordinary tuyeres by a flow through auxiliary tuyeres. To this end, the present invention provides an automatic control apparatus for supplying supplementary flows through the auxiliary tuyeres according to the conditions of the flows through the ordinary tuyeres.

Other objects of the present invention will be made clear by the accompanying drawings and the following explanation.

In order to realize the above object the present invention provides a system which can operate in two ways: that is (a) Operation for the normal runs of the blowing, that is, when the flow through each ordinary tuyere is within a set range calculated on the basis of an average value of flows through all ordinary tuyeres, and (b) Operation for abnormal runs of the blowing, that is, when the flow through any ordinary tuyere is outside of said set range (above the upper limit of the set range, or below the lower limit of the set range).

In the case of the normal runs of blowing, the supplementary supply of the blast gas through the auxiliary tuyeres is for the purpose of obtaining a uniform distribution of flow by supplying blast gas into the dead angles between ordinary tuyeres. This kind of blowing through the auxiliary tuyere in the normal runs is termed "patrol blowing."

The actual method of carrying out this patrol blowing is by blowing of the blast through successive sets of auxiliary tuyeres each consisting of two auxiliary tuyeres lying on opposite sides of an ordinary tuyere. In the specific embodiment of the present invention there are 16 ordinary tuyeres and 16 auxiliary tuyeres. Therefore, a first set of two auxiliary tuyeres are the auxiliary tuyeres on opposite sides of the first ordinary tuyere. The next successive set must be the auxiliary tuyere between the first and second ordinary tuyeres and the auxiliary tuyere between the second and third ordinary tuyeres to obtain a uniform distribution of flow in all dead corners. For this purpose the present invention provides a circuit for changing the sets of auxiliary tuyeres.

Next, in the case of abnormal runs of blowing, that is, when it has been detected that the flow through any one or more of the ordinary tuyeres exceeds the upper limit of the set range or falls below the lower limit of said set range, the operation which constitutes said patrol blowing is changed.

The method of changing the patrol blowing differs according to whether the flow through an ordinary tuyere exceeds the upper limit or falls below the lower limit of the set range;

(a) When the flow through ordinary tuyere exceeds the upper limit of the set range, a set of two auxiliary tuyeres lying on opposite sides of that ordinary tuyere, is bypassed, i.e. no blowing through these auxiliary tuyeres is carried out, (b) When the flow through any ordinary tuyere falls below the lower limit of the set range, said patrol blowing is stopped and blowing through a set of auxiliary tuyeres lying on opposite sides of that ordinary tuyere is started at once;

(c) When the flows through two or more ordinary tuyeres fall below the lower limit of the set range simultaneously, said patrol blowing is also stopped and the blowing through a set of auxiliary tuyeres lying on opposite sides of these ordinary tuyeres respectively is started selectively at once and is carried out in turn.

The present invention provides several circuits for automatically controlling the above supplementary supply of the blast through a set of auxiliary tuyeres according to the aforesaid conditions of flow through each ordinary tuyere.

The drawings show an embodiment of the present invention.

FIGURE 7 is a diagram of the relationship between $CO_2$ and the pressure in the blast furnace.

FIGURE 8 is a developed view showing portions of a switch for limiting the opened and closed positions of the pulsating valve.

FIGURE 9 is a control circuit diagram of relays for the switches fitted to the respective pulsating valves for indicating the closed state of the respective pulsating valves.

FIGURE 10 is a control circuit diagram of relays for the switches fitted to the respective pulsating valves for indicating the open state of the respective pulsating valves.

FIGURE 11 is a circuit diagram of a main circuit for respective pulsating valve control circuits.

FIGURE 12 is a circuit diagram of a control circuit for pulsating valves 5–A, 5–B and 5–C.

FIGURE 13 is a circuit diagram of a control circuit for pulsating valves 5–C, 5–D and 5–E.

Figure 1:
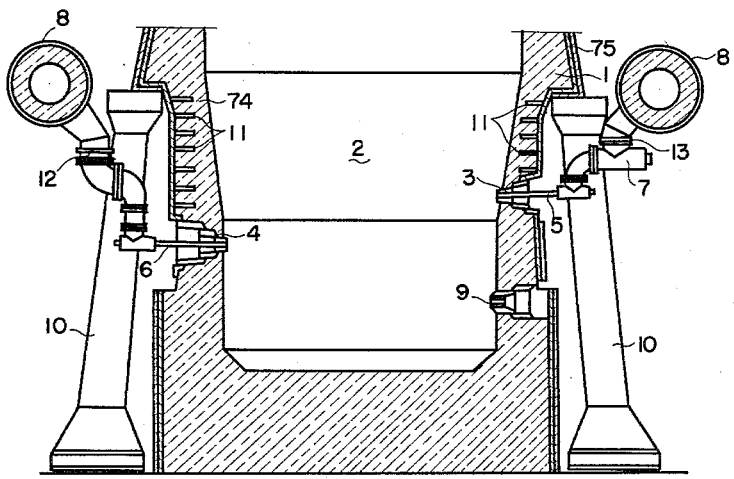
FIGURE 1 is an elevation view, partly in section, of the lower part of a blast furnace showing an embodiment of the present invention.

The device of the present invention will now be explained in detail with reference to the embodiment illustrated in the drawings.

FIGURE 1 is an elevational view, partly in section, of the lower part of a blast furnace body showing blast furnace breast bricks 1, a blast furnace interior 2, an iron furnace body cover 75, an ordinary tuyere 6, an ordinary tuyere cooling box 4, an ordinary tuyere blast branch pipe 12, an annular blast pipe 8, a funnel-shaped brick part 74, funnel-shaped part cooling boxes 11, a slag outlet port 9, an auxiliary tuyere 5, an auxiliary tuyere cooling box 3, an auxiliary tuyere blast pulsating valve 7, an auxiliary tuyere blast branch pipe 13 and furnace breast stays 10.

Figure 2:
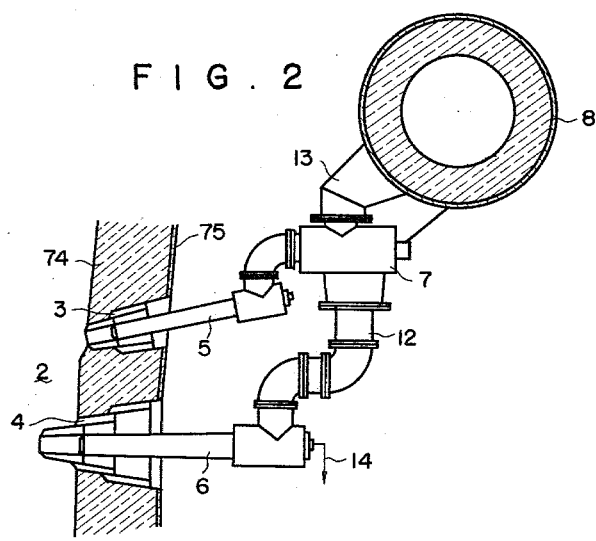
FIGURE 2 is a sectional side elevation view taken on line A—A of FIG. 3 of the tuyere part of the blast furnace.

FIGURE 2 is a sectional side elevation view of the ordinary tuyere and auxiliary tuyere and shows the iron blast furnace body cover 75, the interior 2, the funnel-shaped brick part 74, the ordinary tuyere cooling box 4, the ordinary tuyere 6, the ordinary tuyere blast branch pipe 12, a flow or pressure detecting outlet port 14, the auxiliary tuyere cooling box 3, the auxiliary tuyere 5, the auxiliary tuyere blast pulsating valve 7, the auxiliary tuyere blast branch pipe 13 and the annular blast pipe 8. The auxiliary tuyere 5 is set above the ordinary tuyere 6 and is directed downward toward the center of the furnace toward a point on the horizontal line from the ordinary tuyere in the furnace interior 2 so that the damage to the funnel-shaped brick part 74 can be prevented and at the same time sufficient oxygen can be fed to the dead spaces part between the ordinary tuyeres. However, the present invention is not to be limited to the system described above.

Figure 3:
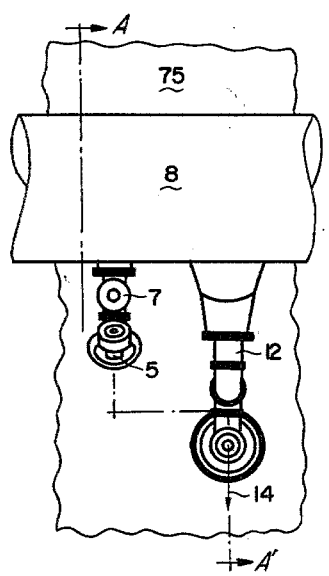
FIGURE 3 is a side elevation view of the tuyere part of the blast furnace.

FIGURE 3 is a side elevation view of the lower part of the blast furnace body and shows the blast furnace body cover 75, the annular blast pipe 8, the pulsating valve 7 for the auxiliary tuyere, the auxiliary tuyere 5, the ordinary tuyere branch pipe 12 and the flow or pressure detecting outlet port 14.

Figure 4:
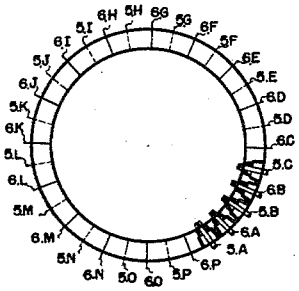
FIGURE 4 is a plan view of the furnace, partly in section and on a reduced scale, showing the positions of the ordinary tuyeres and auxiliary tuyeres.

FIGURE 4 is a plan view showing the positions of the ordinary tuyeres and auxiliary tuyeres and shows 16 ordinary tuyeres 6–A, 6–B, 6–C, 6–D, 6–E, 6–F, 6–G, 6–H, 6–I, 6–J, 6–K, 6–L, 6–M, 6–N, 6–O and 6–P corresponding to the ordinary tuyere 6, and 16 auxiliary tuyeres 5–A, 5–B, 5–C, 5–D, 5–E, 5–F, 5–G, 5–H, 5–I, 5–J, 5–K, 5–L, 5–M, 5–N, 5–O, and 5–P corresponding to the auxiliary tuyere 5. In the present device, for example, 16 ordinary tuyeres and 16 auxiliary tuyeres are provided. However, the number of the auxiliary tuyeres is not limited. Any odd number may also be used.

Figure 5:
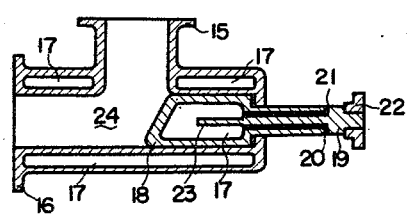
FIGURE 5 is a sectional view of a pulsating valve for the auxiliary tuyere taken on line A—A' in FIGURE 6.
Figure 6:
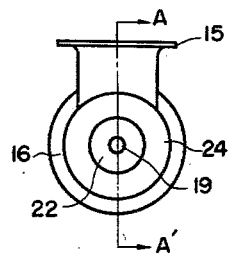
FIGURE 6 is an end elevation view of the pulsating valve for the auxiliary tuyere.

FIGURES 5 and 6 show an embodiment of the auxiliary tuyere blast pulsating valve fitted to each of the auxiliary tuyeres 5–A to 5–P shown in FIGURE 4. In FIGURES 5 and 6 are shown a valve body 24, a flange 15 for the blast branch pipe, a flange 16 for the blast tuyere, a valve cooling jacket 17, a push-in valve 18, a cooling water guide plate 23, a cooling water feeding port 20, a cooling water discharge port 21, a valve control rod 19 and a coupling 22. This particular type of valve is not essential; a butterfly-valve or any other valve can be used. The valve drive can be an oil pressure, air pressure or electrically operated type.

FIGURE 7 shows the variation of $CO_2$ in the furnace top gas at the time of bridging. The percent of $CO_2$ is shown at 27, and there are also shown slips 28, 29 and 30, time 33, the period 25 of the elevated pressure within the furnace, the period 26 of unfavorable fall, bridge formation 31 and bridge dropping 32. It is seen from this diagram that, when the pressure within the furnace becomes higher due to bridge formation, the amount of $CO_2$ will progressively increase and that, when the bridge drops, the pressure within the furnace will drop and the amount of $CO_2$ will decrease. In other words, it may be considered that, when the pressure within the furnace is elevated, the reducing velocity will increase and the solution loss will decrease or carbon deposition will be accelerated. It is also known from these facts that, when the pressure within the furnace is made to pulsate by the auxiliary tuyeres, the reducing reaction will be greatly accelerated.

FIGURE 8 shows an example of a limit switch for determining the amount of the opening and closing of the auxiliary tuyere pulsating valve shown in FIGURES 5 and 6. A closing direction 38, an opening direction 39, a stopping point 34 at the closing position, a stopping point 35 at the opening position, a cam 36 operating during closing, a cam 37 operating during opening, a limit switch contact point Q operating during closing and a limit switch contact point R operating during opening are shown in FIGURE 8. In the operation thereof, when the cam is located at the stopping point 34 for closing, as in the drawing, the limit switch contact Q for closing will be closed and the limit switch contact R for opening will remain open. However, as soon as the valve begins to open in the opening direction 39, the limit switch Q for closing will open. When the stopping point 35 for opening is reached, as shown in the drawing, the limit switch contact R for opening will be closed. On the other hand, as soon as the valve begins to close in the closing direction 38, the limit switch R for opening will open. When the stopping point 34 for closing is reached, the limit switch Q for closing will again be closed. Thus, the limit switches Q and R will be closed only at the respective stopping points 34 and 35 and will remain open at other points. Needless to say, the limit switches are mounted adjacent each auxiliary tuyere pulsating valve.

FIGURE 9 shows a relay circuit for the operation of the limit switches shown in FIGURE 8 respectively operated by the 16 auxiliary tuyere pulsating valves shown in FIGURE 4. A main line power supply 40, valve closing limit switch contacts points 5–AQ351, 5–BQ351, 5–CQ351, 5–DQ351, 5–EQ351, 5–FQ351, 5–GQ351, 5–HQ351, 5–IQ351, 5–JQ351 5–KQ351, 5–LQ351, 5–MQ351, 5–NQ351, 5–OQ351, and 5–PQ351, and valve closing limit switch relays 5–AQ352, 5–BQ352, 5–CQ351, 5–DQ352, 5–EQ352, 5–FQ352, 5GQ352, 5–HQ352, 5–IQ352, 5–JQ352, 5–KQ352, 5–LQ352, 5–MQ352, 5–NQ352, 5–OQ352, and 5–PQ352 are shown in FIGURE 9.

FIGURE 10 shows, as in FIGURE 9, a main line power supply 40, valve opening limit switch contacts 5–AR353 to 5–PR353 and valve opening limit switch relays 5–AR354 to 6–PR354.

FIGURES 11, 12, 13, 14, 15, 16, 17 and 18 show automatic control circuits for automatically controlling the pulsating valves for the 16 auxiliary tuyeres shown in FIGURE 4. FIGURE 11 is a main circuit for the auxiliary tuyeres and shows a main line power supply 40, an on-off switch 41, an operating main line 42, a starting push button 43, a normally closed contact 44 opened by a stopping relay 51, a self-holding normally open contact 45 closed by a starting relay 50, a normally closed contact 46 opened by a relay 68 for indicating all pulsating valves are in closed positions, a stopping push button 47, a normally open contact 48 closed by the starting relay 50, a self-holding normally open contact 49 closed by a stopping relay 51, a normally open contact 52 closed by the valve closing limit switch relay 5–AQ352 shown in FIGURE 9, normally open contacts 53–67 closed by limit switch relays 5–BQ352–PQ352 respectively, normally open contact 69 closed by a final pulsating valve switching relay 197 shown in FIGURE 13, a normally open contact 70 and a normally closed contact 74 opened by a pulsating valve combination changing relay 83, a self-holding normally open contact 72 closed by a combination selecting relay 73, an internally inserted closed contact 75, a normally open contact 78, a self-holding normally closed contact 76 opened by a combination selecting relay 77, an internally inserted normally closed contact 71, and normally open contact 80, a normally closed contact 81 opened by an auxiliary relay 79 for the combination selecting relay 73, a self-holding normally open contact 85 closed by a relay 83, a normally closed contact 82 opened by a pulsating valve combining relay 271 by the ordinary tuyere flow shown in FIGURE 18, a normally open contact 84 similarly closed by relay 283, a normally closed contact 88 closed by an ordinary tuyere flow lower limit detection selection control switching timer 349 shown in FIG. 19 and its switching operating main line 392, a normally closed contact 86 opened by a pulsating valve combination relay 271 shown in FIGURE 18 and a normally closed contact 87 for 283 and its switching main line 350.

Figure 14:
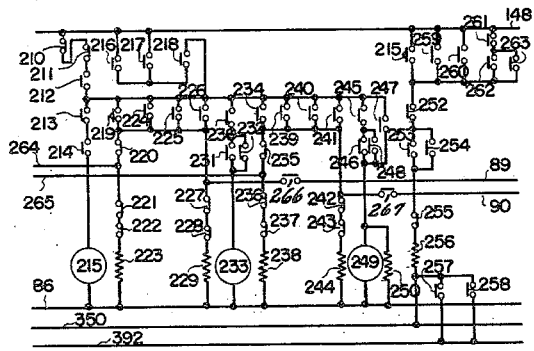
FIGURE 14 is a circuit diagram of a control circuit for pulsating valves 5–O, 5–P and 5–A.
Figure 16:
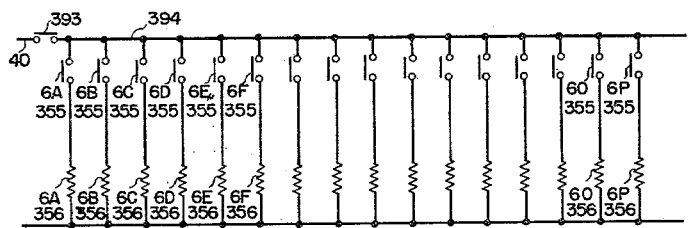
FIGURE 16 is a circuit diagram of an ordinary tuyere upper limit flow or pressure detecting control relay circuit.
Figure 17:
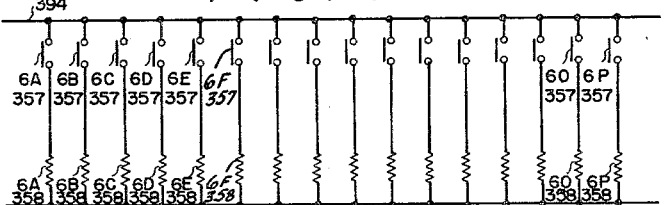
FIGURE 17 is a circuit diagram of an ordinary tuyere lower limit flow or pressure detecting control relay circuit.

FIGURE 12 is a pulsating valve control circuit for the auxiliary tuyeres 5–A and 5–B shown in FIG. 4 and shows an operating main line 86, a normally open contact 93 closed by the starting relay 50, normally closed contacts 94 and 95 closed by the ordinary tuyere flow upper limit detection control relays 6–A356 and 6–B356 respectively shown in FIG. 16, a normally open contact 96 closed by a pulsating valve switching relay 256 for the auxiliary tuyeres 5–O and 5–P shown in FIGURE 14, a normally open contact 97 closed by the relay 5–AQ352 for the valve closing limit switch for the auxiliary tuyeres 5–A and 5–B, a normally open contact 98 closed by relay 5–BQ352, as shown in FIG. 9, a normally open contact 103 closed by a valve opening time limit timer 99, a normally open self-holding contact 108 and internally inserted normally closed contact 112 actuated by a valve opening driving electromagnetic switch 107 for the auxiliary tuyere 5–A, a normally open self-holding contact 109 and internally inserted normally closed contact 106 actuated by a valve opening driving electromagnetic switch 113 for the auxiliary tuyere 5–B, a normally open self-holding contact 110 closed by a valve opening driving electromagnetic switch 161 for the auxiliary tuyere 5–C shown in FIGURE 13, a normally closed contact 105 and a normally open contact 115 actuated by the valve opening limit switch relay 5–AR354, a normally closed contact 111 and normally opened contact 114 actuated by relay 5–BR354, a normally open contact 116 closed by the valve opening limit switch relay 5–CR354, a normally open contact 118 closed by a valve closing time limit timer 117, a normally open self-holding contact 123 and internally inserted normally closed contact 127 actuated by a valve closing driving electromagnetic switch 122 for the auxiliary tuyere 5–A, a normally open self-holding contact 124 and an internally inserted normally closed contact 121 actuated by a valve closing driving electromagnetic switch 128 for the auxiliary tuyere 5–B, a normally open self-holding contact 125 closed by a valve closing driving electromagnetic switch 179 for the auxiliary tuyere 5–C shown in FIGURE 13, a normally closed contact 120 opened by the valve closing limit switch relay 5–AQ352, a normally closed contact 126 opened by relay 5–BQ352, a normally open contact 130 closed by the valve opening limit switch relay 5–AR354, a normally open contact 129 closed by relay 5–BR354, a normally open contact 133 closed by the valve opening limit switch relay 5–CR354, a normally open self-holding contact 132 closed by a valve opening memory relay 134, a normally open contact 135 closed by a pulsating memory switching timer 131, a normally open contact 136 closed by a valve closing limit switch relay 5–AG352, a normally open contact 137 closed by relay 5–BQ352, a normally open contact 138 closed by relay 5–CQ352, a normally open self-holding contact 145 closed by a valve switching relay 140, pulsating valve starting push button 144 closed by a valve switching relay 140, a normally open contact 145 closed by a pulsating memory switching relay 256 shown in FIGURE 14, a normally open contact 146 for an ordinary tuyere upper limit detecting control relay 6–A356, a normally open contact 147 closed by relay 6–B356 shown in FIGURE 16, a normally closed contact 139 opened by a pulsating memory switching relay 197 shown in FIGURE 13, normally open contacts 141 and 100 closed by the ordinary tuyere flow lower limit detecting relay 6–A358, normally open contacts 142 and 101 closed by relay 6–B358 shown in FIGURE 17, and a normally open contact 102 closed by a selecting pulsating valve memory relay 294.

Figure 19:
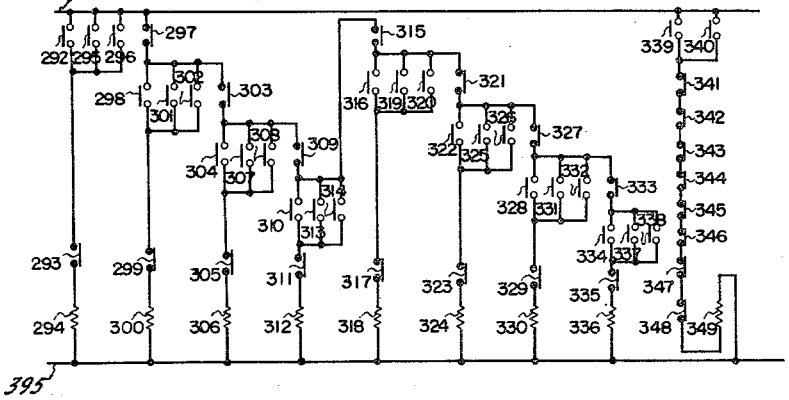
FIGURE 19 is a circuit diagram of a lower limit detecting pulsating valve control memory order starting circuit.

FIGURE 13 is a pulsating valve control circuit for the auxiliary tuyeres 5–C and 5–D shown in FIGURE 4 and shows a normally closed contact 151 opened by an ordinary tuyere flow upper limit detecting relay 6–C356, a normally closed contact 152 closed by relay 6–D356, a normally open contact 153 closed by the pulsating valve switching relay 140 for the auxiliary tuyeres 5–A and 5–B shown in FIGURE 12, a normally open contact 154 closed by the valve closing limit switch relay 5–CQ352 for the auxiliary tuyeres 5–C and 5–D, a normally open contact 155 closed by relay 5–DQ352, a normally open contact 157 closed by a valve opening time limit timer 156, a normally open self-holding contact 162 and an internally inserted normally closed contact 166 actuated by a valve opening driving electromagnetic switch 161 for the auxiliary tuyere 5–C, a normally open self-holding contact 163 and an internally inserted normally closed contact 160 actuated by a valve opening driving electromagnetic contactor 167 for the auxiliary tuyere 5–D, a normally open self-holding contact 164 closed by a valve opening driving electromagnetic switch for the next auxiliary tuyere 5–E, a normally closed contact 159 and normally open contact 172 actuated by the valve opening limit switch relay 5–CR354, a normally closed contact 165 and normally open contact 171 actuated by relay 5–DQ354, a normally open contact 174 closed by the valve opening limit switch relay 5–ER354, a normally open contact 175 closed by a valve closing time limit timer 173, a normally open self-holding contact 180 and an internally inserted normally closed contact 184 actuated by a valve closing driving electromagnetic switch 179 for the auxiliary tuyere 5–C, a normally open self-holding contact 181 and an internally inserted normally closed contact 178 actuated by a valve closing driving electromagnetic switch 185 for the auxiliary tuyere 5–D, a normally open self-holding contact 182 closed by a valve closing driving electromagnetic switch for the auxiliary tuyere 5–E, a normally closed contact 177 opened by the valve closing limit switch relay 5–CQ352, a normally closed contact 183 opened by relay 5–EQ352, a normally open contact 187 closed by a valve opening limit switch relay 5–CR354, a normally open contact 186 closed by a relay 5–DR352, a normally open contact 189 closed by a valve opening limit switch relay 5–ER352, a normally open self-holding contact 190 closed by a valve opening memory relay 191, a normally open contact 192 closed by a pulsation memory switching timer 188, a normally open contact 193 closed by the valve closing limit switch relay 5–CQ352, a normally open contact 194 closed by relay 5–DQ352, a normally open contact 195 closed by relay 5–EQ352, a normally open self-holding contact 200 closed by a valve switching relay 197, a pulsating valve starting push button 201, a normally open contact 202 closed by the pulsating memory switching relay 140 shown in FIGURE 12, a normally open contact 203 closed by an ordinary tuyere upper limit detecting relay 6–D356, a normally open contact 204 closed by relay 6–E356 shown in FIGURE 16, a normally closed contact 196 opened by the next pulsating memory switching relay, normally open contacts 198 and 168 closed by an ordinary tuyere flow lower limit detecting control relay 6–C358, normally open contacts 199 and 169 closed by relay 6–D358 shown in FIGURE 17, and a normally open contact 170 closed by a selecting pulsating valve memory relay 300 shown in FIGURE 19.

FIGURE 14 is a pulsating valve control circuit for the final auxiliary tuyeres 5–O and 5–P shown in FIGURE 4 and shows a normally closed contact 210 opened by an ordinary tuyere flow upper limit detecting control relay 6–O356, a normally closed contact 211 opened by relay 6–P356, a normally open contact 212 closed by a pulsating valve switching relay for the preceding auxiliary tuyeres 5–M and 5–N, a normally open contact 213 closed by the valve closing limiting relay 5–OQ352 for the auxiliary tuyeres 5–O and 5–P, a normally open contact 214 closed by relay 5–PQ352, a normally open contact 219 closed by a valve opening time limit timer 215, a normally open self-holding contact 224 and an internally inserted normally closed contact 228 actuated by a valve opening driving electromagnetic switch 223 for the auxiliary tuyere 5–O, a normally open self-holding contact 225 and an internally inserted normally closed contact 222 actuated by a valve opening driving electromagnetic switch 229 for the auxiliary tuyere 5–P, a normally open self-holding contact 226 closed by a valve opening driving electromagnetic switch 107 for the auxiliary tuyere 5–A shown in FIGURE 12, a normally closed contact 221 and a normally open contact 231 actuated by the valve opening limit switch relay 5–OR354, a normally closed contact 227 and a normally open contact 230 actuated by relay 5–PR354, a normally open contact 232 closed by the valve opening limit switch relay 5–AR354, a normally open contact 234 closed by a valve closing time limit timer 233, a normally open self-holding contact 239 and an internally inserted normally closed contact 243 actuated by a valve closing driving electromagnetic switch 238 for the auxiliary tuyere 5–O, a normally open self-holding contact 240 and an internally inserted normally closed contact 237 actuated by a valve opening driving electromagnetic switch 244 for the auxiliary tuyere 5–P, a normally open self-holding contact 241 closed by a valve closing driving electromagnetic switch 122 for the auxiliary tuyere 5–A, a normally closed contact 236 opened by the valve closing limiter relay 5–OQ352, a normally closed contact 242 opened by relay 5–PQ352, a normally open contact 246 closed by the valve opening limit switch relay 5–OR354, a normally open contact 245 closed by relay 5–PR354, a normally open contact 248 closed by the valve opening limit switch relay 5–AR354, a normally open contact 247 closed by a valve opening memory relay 250, a normally open contact 251 closed by a pulsating memory switching timer 249, a normally open contact 252 closed by the valve closing limit switch relay 5–CQ352, a normally open contact 253 closed by relay 5–PQ352, a normally open contact 254 closed by relay 5–AQ352, a normally open self-holding contact 259 closed by a valve switching relay 256, a push button 260 for starting the pulsating valves 5–A and 5–B, a normally open contact 261 closed by the preceding pulsating memory switching relay, a normally open contact 262 closed by the ordinary tuyere flow upper limit detector 6–O356, a normally open contact 263 closed by relay 6–P356 shown in FIGURE 16, a normally closed contact 255 opened by the pulsating memory switching relay 140 shown in FIGURE 12, normally open contacts 257 and 216 closed by an ordinary tuyere flow lower limit detecting relay 6–O358, normally open contacts 258 and 217 closed by relay 6–P358 shown in FIGURE 17, and a normally open contact 218 closed by a selecting pulsating valve memory relay 336 shown in FIGURE 19.

Connecting lines 89 and 90 shown in FIGURES 14 and 12, connecting lines 91 and 92 shown in FIGURES 12 and 13, connecting lines 207 and 208 connected from the circuit in FIG. 13 to the next control circuit and connecting lines 264 and 265 connected from the pulsating valve control circuit for 5–M and 5–N to the final pulsating valves 5–O and 5–P shown in FIG. 14 are for the purpose of changing the combination of the pulsating valves through the normally open contacts 149, 150, 205, 206, 266 and 267 and the normally closed contacts 104, 119, 158, 176, 220 and 235 actuated by the pulsating valve combination changing relay 83, respectively. For example, if the pulsating valves for the auxiliary tuyeres in FIGURE 4 are to be explained with reference to FIGURES 12 and 13, they may be combined with the pulsating valves 5–A and 5–B or with the pulsating valves 5–C and 5–D.

Figure 15:
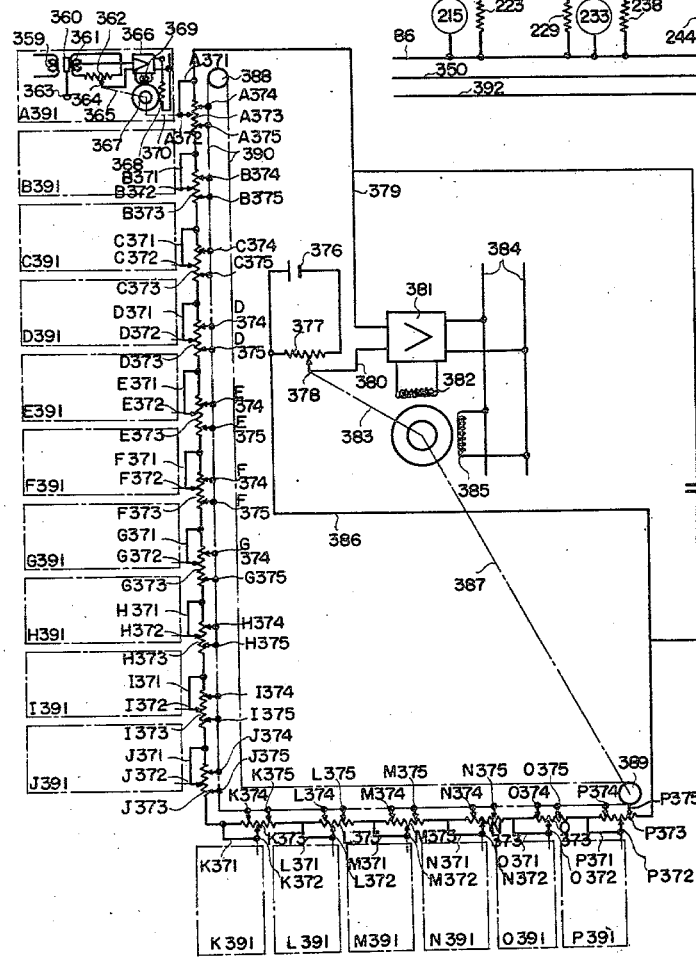
FIGURE 15 is a circuit diagram of a detecting electron tube circuit.

FIGURE 15 shows an electron tube circuit diagram for scanning a set range for the average flow or pressure of the ordinary tuyere. A number of conventional electron tube type meters A391, B391 to O391 and P391 are provided as there are ordinary tuyeres. Each electron tube type meter has a construction such as is shown in A391 and contains a primary winding 359, float 363, iron core 360, secondary coil 361, balance motor 367, rehostat 362, sliding contact 364, electron tube type amplifier 366, control coil 369, electric power supply coil 368 and power transmitting devices 365 and 370. The ordinary tuyere 6–A is provided with a sliding contact A372, series rehostat resistance A373, sliding contact lead wire A371, upper limit detector A374 and lower limit detector A375.

The ordinary tuyere 6–B is provided with a sliding contact B372, series rehostat resistance B373, sliding contact lead wire B371, upper limit detector B374 and lower limit detector B375. The ordinary tuyeres down to 6–P are each provided with such a meter in the same manner. There are shown a detector fitting belt 390, rotary drums 388 and 389, power transmitting devices 387 and 383, series resistance lead wires 379 and 386, battery 376, balancing rehostat resistance 377, sliding contact 378, sliding contact lead wire 380, electron tube amplifier 381, control coil 382, electric power supply coil 385 and alternating current source 384.

FIGURE 16 shows an electric power supply main line 40, a normally closed contact 393 opened by a valve full closing indicating relay, an operating main line 394, a normally open contact 6–A355 closed by the upper limit detector 6–A374, a normally open contact 6–B355 closed by the relay 6–B374, an upper limit detecting relay 6–A356 for the ordinary tuyere 6–A, an upper limit detecting relay 6–B356 for tuyere 6–B and an upper limit detecting relay 6–P356 for tuyere 6–P.

FIGURE 17 shows an operating main line 394, a normally open contact 6–A357 closed by a lower limit detector 6–A375, a normally open contact 6–B357 closed by relay 6–B375, a lower limit detecting relay 6–A358 for the ordinary tuyere 6–A, a lower limit detecting relay 6–B358 for tuyere 6–B and a lower limit detecting relay 6–P358 for tuyere 6–P.

Figure 18:
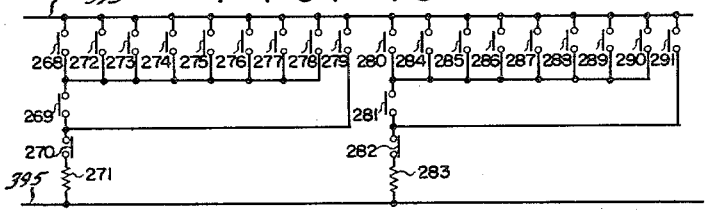
FIGURE 18 is a circuit diagram of a detecting relay circuit in which the combination of pulsating valves is changed.

FIGURE 18 shows an electric power supply main line 395, a normally open contact 268 closed by a lower limit detecting relay 6–A358, a normally open contact 272 closed by relay 6–C358, a normally open contact 273 closed by relay 6–E358, a normally open contact 274 closed by relay 6–G358, a normally open contact 275 closed by relay 6–I358, a normally open contact 276 closed by relay 6–K358, a normally open contact 277 closed by relay 6–M358, a normally open contact 278 closed by relay 6–O358, normally open contacts 269 and 281 closed by a valve full opening indicating relay 68, a normally open self-holding contact 279 and internally inserted normally closed contact 282 actuated by a pulsating valve combination selecting relay 271, a normally open self-holding contact 291 and internally inserted normally closed contact 270 actuated by a pulsating valve combination selecting relay 283, a normally open contact 280 closed by a lower limit detector 6–B358, a normally open contact 284 closed by relay 6–D358, a normally open contact 285 closed by relay 6–F358, a normally open contact 286 closed by relay 6–H358, a normally open contact 287 closed by relay 6–J358, a normally open contact 288 closed by relay 6–L358, a normally open contact 289 closed by relay 6–N358, and a normally open contact 290 closed by relay 6–N358, and a normally open contact 290 closed by relay 6–P358.

FIGURE 10 shows an electric power supply main line 395, a normally open contact 292 closed by a lower limit detecting relay 6–A358 for an ordinary tuyere 6–A, a normally open contact 295 closed by a lower limit detecting relay 6–B358 for the ordinary tuyere 6–B, a normally closed contact 293 opened by a switching relay 140, a normally open self-holding contact 296 and normally closed contacts 297 and 341 actuated by a selecting pulsating valve memory relay 294, a normally open contact 298 closed by a lower limit detecting relay 6–C358 for the ordinary tuyere 6–C, a normally open contact 301 closed by a lower limit detecting relay 6–D358 for the ordinary tuyere 6–D, a normally closed contact 299 opened by the pulsating valve switching relay 197 for the auxiliary tuyeres 5–C and 5–D shown in FIGURE 13, a normally open self-holding contact 302 and normally closed contacts 303 and 342 actuated by a selecting pulsating valve memory relay 300, a normally closed contact 304 opened by a lower limit detecting relay 6–E358 for the ordinary tuyere 6–E, a normally closed contact 307 opened by a lower limit detecting relay 6–F358 for tuyere 6–F, a normally closed contact 305 opened by a pulsating valve switching relay for the auxiliary tuyeres 5–E and 5–F, and a normally open self-holding contact 308 and normally closed contacts 309 and 343 actuated by a selecting pulsating valve memory relay 306. The circuit down to the ordinary tuyere 6–P is the same as in the above. The timer circuit has a normally open contact 339 closed by the pulsating valve combination selecting relay 271 and a normally open contact 340 for relay 283 shown in FIGURE 18, and an ordinary tuyere flow lower limit detecting selecting control switching timer 349.

The present invention has a construction such as is described above. Its operation will be set forth in detail in the following. The operation of the auxiliary tuyeres 5–A to 5–P are carried out in two kinds of combinations, the combination of 5–A with 5–B, 5–C with 5–D, 5–E with 5–F (and so forth in the same manner) as one kind, and the combination of 5–B with 5–C, 5–D with 5–E . . . 5–N with 5–O and 5–P with 5–A as another kind. For example, when the on-off switch 41 shown in FIGURE 11 is closed and the starting push button 43 is pushed, the starting relay 50 will be excited through the normally closed contact 44 of the stopping relay 51 and will be by the self-holding contact 45. By the excitation of the starting relay 50, the normally open contact 48 in the circuit of the stopping relay 51 and the normally open contact 93 shown in FIGURE 12 will be closed. With the closure of 93, an electric current will pass through the operatively connected mainline 148 of the pulsating valve control circuit shown in FIGURE 12. At this time, for example, if the device is to be driven from the pulsating valves 7–A and 7–B fixed to the auxiliary tuyeres 5–A and 5–B shown in FIGURE 4, when the starting push button 260 in the circuit of the pulsating valve switching relay 256 shown in FIGURE 14 is pushed, the relay 256 will be excited and the normally open contact 96 will be closed. Then, as the pulsating valves 7–A and 7–B will be fully closed, the control switch will be at the closing stopping point 34, the pulsating valve closing limit switch contacts 5–AQ351 and 5–BQ351 will be closed and relays 5–AQ352 and 5–BQ352 will be excited. Therefore, the normally open contacts 97 and 98 will remain closed and the valve opening timer 99 will directly start the operation. After a certain period of time (for example, 0 to 1 hour as selectively determined according to the state of the furnace at that time), the normally open contact 103 will be closed. Then both valve opening electromagnetic switches 107 and 113 will be excited and will be kept energized by the closing of the normally open contacts 108 and 109. Therefore, the valve driving motor or any other driving means will operate to move the pulsating valve in the opening direction. When the set opening stopping point 35 is reached, the valve opening limit switch contacts 5–AR353 and 5–BR353 will be closed. Therefore, the relays 5–AR354 and 5–BR354 will be excited and the normally closed contacts 105 and 111 will be opened. Thus, the electromagnetic switches 107 and 113 will be demagnetized and the movement of the driving means will be stopped. Then the pulsating valve will be fully opened and blasts will be fed through the auxiliary tuyeres 5–A and 5–B. Because the normally open contacts 115 and 114 will be closed by the excitation of the valve opening limit switches 5–AR354 and 5–BR354, the valve closing starting timer 117 will begin to operate and, after a certain period of time (for example 0 to 1 hour as selected according to the state of the furnace at that time), the normally open 8 contact 118 will be closed. Then the valve closing electromagnetic switches 122 and 128 will be excited, will be held by the self-holding contacts 123 and 124 and the driving means will be moved in the closing direction. The valve closing limit switch contacts 5–AQ351 and 5–BQ351 will be again closed, the relays 5–AQ352 and 5–BQ352 will be excited, the normally closed contacts 129 and 126 will be opened, the electromagnetic switches 122 and 128 will be demagnetized and the movement of the driving means will be stopped. However, when the valve is opened, the contacts 130 and 129 of the valve opening limit switches 5–AR354 and 5–BR352 will be closed and the circuit of the timer 131 will be held by the self-holding contact 132 of the auxiliary relay 134. Therefore after a certain period of time, the normally open contact 135 will be closed. By adjusting the setting of this time, it is possible to repeat the opening and closing of the pulsating valve several times. When the contact 135 is closed, the normally open contacts 136 and 133 will be closed by the excitation of the valve closing limit switch relays 5–AQ352 and 5–BQ352. Therefore, the valve switching relay 140 will be excited and will be held by the self-holding contact 143.

The normally open contact 153 (FIGURE 13) of the relay 140 will be normally closed. At the same time, the closed contact 255 in the circuit of the valve switching relay 256 shown in FIGURE 14 will be opened, the relay 256 will be demagnetized and the normally open contact 96 in the circuit of the pulsating valves 7–A and 7–B will be opened. Therefore, the pulsating valves 7–A and 7–B will stop the pulsation because they are closed. The circuit of the next pulsation valves 7–C and 7–D is controlled in the same manner as in 7–A and 7–B.

When they are thus controlled in turn and the control of the pulsating valves 7–O and 7–P shown in FIGURE 14 is completed, the valve switching relay 256 will be excited, therefore the normally open contact 69 shown in FIGURE 11 will be closed, the switching selecting relay 77 will be excited through the closed contact 74 of the pulsating valve combination changing relay 83, the normally open contact 80 will be closed, the pulsating valve combination changing relay 83 will be excited and will be held by the contact 85. And the normally open contacts 149, 150, 205, 206, 266 and 267 shown in the respective control circuit diagrams will be closed and the normally closed contacts 104, 119, 158, 176, 220 and 235 will be opened. The combination of the pulsating valves is now changed to be the combination of 5–B with 5–C, 5–D with 5–E . . . 5–N with 5–O and 5–P with 5–A. The control in such case is the same as in the case of the above described pulsating valves 5–A and 5–B. FIGURE 12 will now be described. The normally open contact 96 will be closed by the excitation of the valve switching relay 256 shown in FIGURE 14. The timer 99 will begin to operate. In some time, the normally open contact 103 will be closed, the electromagnetic switch 113 will be excited and at the same time the electromagnetic switch 161 in FIGURE 13 will be excited by the lead wire 91 through the normally open contact 149 which has been closed by the pulsating valve combination changing relay 83. Therefore, the pulsating valves will be in a combination of 5–B with 5–C and will be moved in the opening direction. When the opening stopping point 35 is reached, the relays 5–BR354 and 5–CR354 will be excited by the closing of the valve opening limit switch contacts 5–BR353 and 5–CR353, the normally closed contacts 111 and 159 will be opened, the electromagnetic switches 113 and 161 will be demagnetized and the movement of the valves will be stopped. With the excitation of the valve opening limit switch relays 5–BR354 and 5–OR354, the timer 117 is energized by the closing of normally open contacts 114 and 116 and the timer 131 is energized by the closing of the normally open contacts 129 and 133. When timer 117 runs for a certain time, the normally open contact 118 will be closed, the electromagnetic switch 179 will be excited through the now closed contact 150 from the electromagnetic switch 128 and the pulsating valve will be moved in the closing direction. When the timer 249 runs for a certain time while such operation is being repeated, the normally open contact 135 will be closed, the contacts 136 and 138 will be closed by the excitation of the valve closing limit switches 5–BQ352 and 5–CQ352 and the valve switching relay 140 will be excited. In the same manner as in the case of the pulsating valves 7–D and 7–E, the pairs of valves down to the final pulsating valves 7–P and 7–A are controlled so as to cause them to pulsate. Then, with the excitation of the valve switching relay 256, the normally open contact 69 shown in FIGURE 11 will again be closed, the switching relay 73 will be excited through the contact 70 now closed by the pulsating valve combination changing relay 83, will be held by holding contact 72 and excite the auxiliary relay 79 through the now closed contact 78 and will open the normally closed contact 82. Therefore, the self-holding contact for the relay 83 will be opened. And again the combination of the pulsating valves will be changed to tuyeres 7–A with 7–B, 7–C with 7–D to 7–O with 7–P.

The 16 auxiliary tuyeres are to be controlled to pulsate as described above. However, for example, if the state of the blast through the ordinary tuyere is detected by sensing the flow or pressure and is interlocked with the present control circuit as required, as shown in FIGURE 15, the flows or pressure through the respective ordinary tuyeres will be measured with the electron tube meters A391, B391 to O391 and P391 and their displacements will be mechanically transmitted to the separately provided rehostat resistances A373, B373 to O373 and P373. In such case, because the total of the above shown sliding resistance values is made equal to the resistance value of the rehostat resistance 377 for obtaining the average value and the width of the movement of each rehostat resistance is equal to that of the rheostat resistance for the average value, the action of the sliding contact 378 will be shown as the average value of the flows or pressures of all the tuyeres. Therefore, if this action is mechanically transmitted to the rotary drum 389 through the transmitting mechanism 387 and the upper limit detectors A374 to P374 and the lower limit detectors A375 to P375 are set at any values, the variation of the flow or pressure of each tuyere as compared with the average value of each tuyere will be able to be easily detected and it will be possible to selectively control the pulsating valves so as to be always at the average value. For example, the control for the auxiliary tuyeres 5–A and 5–B shown in FIGURE 12 and the auxiliary tuyeres 5–C and 5–D shown in FIGURE 13 will be explained. When the ordinary tuyere 6–A detects the upper limit by the upper limit detector A374 shown in FIGURE 15, the upper limit detecting control relay 6–A356 will be excited by the detector contact 6–A355 shown in FIGURE 16 and the normally open contact 146 and normally closed contact 94 shown in FIGURE 12 will be closed and opened, respectively. Therefore, the valve switching relay 140 will close and close the normally open contact 145 simultaneously with the excitation of the switching relay 256 shown in FIGURE 14 and will close the normally open contact 153 provided in the circuit of the next pulsating valves 7–C and 7–B. Therefore, the normally open contact 96 of the valve switching relay 256 in the control circuit of the pulsating valves 7–A and 7–B will be closed and the normally closed contact 94 of the upper limit detecting control relay 6–A356 will be opened. Thus the control circuit of the pulsating valves 7–A and 7–B will be by-passed and the pulsation of the auxiliary tuyeres 5–A and 5–B located on both sides of the ordinary tuyere 6–A in which the upper limit of the flow or pressure has been detected will not take place. In the case of the ordinary tuyere 6–B, the upper limit detecting relay 6–B356 will be excited and, as soon as the normally open contact 147 is normally closed, the closed contact 95 will be opened. Therefore, the auxiliary tuyeres 5–B and 5–C will be also by-passed. Needless to say, in such case, the pulsating valve combination changing relay 83 will be excited. The above is for the case of the upper limit detection. Further, in the case of the lower limit detection, for example, the control for the ordinary tuyere 6–A shown in FIGURE 12 will be described. When the lower limit detector A375 detects the lower limit and the contact 6–A357 is closed, the lower limit detecting control relay 6–A358 will be excited and the normally open contacts 141 and 142 shown in FIGURE 12 will be closed. Then, at the same time, with the excitation of the lower limit detecting relay 6–A358, the normally open contact 268 in the circuit of the pulsating valve combination selecting relay 271 shown in FIGURE 18 will be closed and the relay 271 will be excited through the normally open contact 269 now closed by the valve full closing indicating relay 68 shown in FIGURE 11. Therefore, by the relay 271, the normally closed contact 86 shown in FIGURE 11 will be opened, the pulsating valve control circuit selected to control the switching main line 350 to be opened will be opened and the auxiliary tuyere pulsating valves 7–A and 7–B of the ordinary tuyere in which the lower limit is detected will be selected and controlled. In the case of the ordinary tuyere 6–B, with the excitation of the lower limit detecting relay 6–B358, the normally open contact 280 shown in FIGURE 18 will be closed, the pulsating valve combination selecting relay 283 will be excited and the normally closed contact 87 shown in FIGURE 11 will be opened. Thus, the other circuits will be opened and, at the same time, in FIGURE 12, the normally open contacts 143 and 101 of the lower limit detecting relay 6–B358 will be closed. In such case, because the pulsating valves must be the combination of 7–A with 7–B and 7–B with 7–C, it will be necessary to operate the combination changing relay 83 and, by the excitation of the relay 283, the normally open contact 84 in the circuit of the changing relay 83 will be closed and the changing relay 83 will be excited. As soon as the lower limit is thus detected, the tuyere will be selectively controlled. Further, in case the lower limit is simultaneously detected in two or three tuyeres, the simultaneous pulsation of them will have such a great influence on the ordinary tuyeres that the detection will be memorized by the lower limit detecting pulsating valve control memory order starting circuit shown in FIGURE 19 and will be controlled in turn. That is to say, for example, if the lower limit is simultaneously detected in the ordinary tuyeres 6–A and 6–C, the normally open contact 292 of the lower limit detecting relay 6–A358 of the ordinary tuyere 6–A will be closed and the selecting pulsating valve memory relay 294 will be excited. Therefore, the normally closed contact 297 will be normally open and the opened contact 298 of the lower limit detecting relay 6–O358 of the ordinary tuyere 6–C will be closed but the selecting pulsating valve memory relay 300 will not be excited. The normally open contact 170 shown in FIGURE 13 will not be closed and the pulsating valve will not pulsate. On the other hand, with the excitation of the selecting pulsating valve memory relay 294, the normally open contact 108 shown in FIGURE 12 will be closed and, therefore, the pulsating valves of 7–A and 7–B will begin the pulsation control. When the pulsating valve switching relay 140 is excited, the normally closed contact 293 in the closed circuit of the relay 294 shown in FIGURE 19 will be opened, therefore, the relay 294 will be deenergized and the normally closed contact 297 will remain closed. Therefore, the pulsating valve circuit of the next ordinary tuyere 6–C will begin the control with the pressure excitation of the relay 300. When all the control is thus finished, the respective relays 294, 300, 306, 312, 318, 324, 330 and 336 will be deenergized and the respective normally open contacts 341, 342, 343, 344, 345, 346, 347, and 348 in the circuit of the ordinary tuyere flow lower limit detecting selecting control switching timer 349 will be closed. Therefore, the timer 349 will begin to operate through the normally open contact 339 or 340 now closed by the pulsating valve combination selecting relay 271 or 283.

After a period of time (adjusted to be 0 to 3 minutes), the closed contact 88 shown in FIGURE 11 will be opened and the switching operating main line 392 will be opened. Therefore, the valve switching relays 140 and 197 which have been held by the completion of the pulsation of the pulsating valves will be deenergized and the pulsation will be repeated until detection of the lower limit no longer occurs. When there is no longer any ordinary tuyere in which the lower limit is detected, all the auxiliary tuyeres will again be placed under periodical pulsation control. Because any switching to be carried out in this controlling operation is through the normally open contact of the valve full closing indicating relay 68, the switching will always be carried out only when the pulsating valve is fully closed.

As shown in the above, the flows or pressures of the blasts through the ordinary tuyeres 6–A, 6–B, 6–O and 6–P are detected, the average value of them is automatically found and the detected value of the flow or pressure of the blast is always maintained within a set range for the average value and is automatically controlled so that the reaction in the furnace can always be kept at the optimum. When the blasts through the ordinary tuyeres are all kept within the set range of the average value, the auxiliary tuyeres will be made to pulsate in turn at a fixed frequency.

The advantages of operating the blast furnace according to the present invention are that, because the blast through the auxiliary tuyere is made to pulsate at a required frequency and the gas which has entered cracks in the ore is replaced with a fresh gas by the pulsation, the reducing reaction of the ore will be accelerated, sufficient oxygen will be fed to the dead spaces between the ordinary tuyeres, the flow of the blast through the ordinary tuyere will be increased and the amount of production of pig iron will be increased; that, because the flow through each tuyere is automatically controlled, the flows of the blasts through the respective tuyeres will become uniform; and that, because the furnace core of the blast furnace is made uniformly circular, there will be no local corrosion of the furnace wall bricks, the coke ratio will be reduced, the operation of the blast furnace will be remarkably stabilized and the productivity will be increased.

What we claim is:

1. An apparatus for use with a blast furnace having ordinary tuyeres and auxiliary tuyeres, said apparatus being for automatically controlling the flow of gas through the ordinary tuyeres and the auxiliary tuyeres, said apparatus comprising
   (1) a plurality of flow detecting means adapting to be coupled one to each ordinary tuyere for detecting the gas flow through each ordinary tuyere,
   (2) average flow calculating means to which said plurality of flow detecting means are connected for calculating the average flow through the ordinary tuyeres,
   (3) a plurality of variation detecting means adapted to be coupled one to each ordinary tuyere for detecting variations of the flow through each ordinary tuyere from the calculated average, said variation detecting means being coupled to said average flow calculating means,
   (4) a plurality of pulsating valves adapted to be mounted one in each auxiliary tuyere, each valve having a driving means,
   (5) a plurality of control means coupled one to each driving means,
   (6) a plurality of timer means coupled one to each control means for operating said control means periodically,
   (7) a plurality of pairing means for actuating pairs of said control means in sequence and for changing the pairs of control means actuated from a first group of pairs to a second group of pairs which is different from the first group of pairs, said pairing means being coupled to said control means,
(8) a plurality of limit detecting means adapted to be coupled one to each ordinary tuyere for detecting when the flow in each ordinary tuyere reaches a variation from said calculated average corresponding to present limits,
(9) by-passing control means for actuating said pairing means to bypass the actuation of pairs of said control means when the said limit detecting means detects a flow in an ordinary tuyere which is above the said preset limit from said calculated average, said by-passing control means being coupled between said plurality limit detecting means and said plurality of pairing means, and
(10) selective operating means for selectively operating at least one pair of auxiliary tuyeres lying on opposite sides of an ordinary tuyere when the flow in at least one ordinary tuyere is below the preset lower limit from said calculated average, said selective operating means being coupled between said plurality of limit detecting means and said plurality of pairing means.

2. An appartus for use with a blast furnace having ordinary tuyeres and auxiliary tuyeres, said apparatus being for automatically controlling the flow of gas through the ordinary tuyeres and the auxiliary tuyeres, said apparatus comprising
(1) a plurality of flow detecting means adapted to be coupled one to each ordinary tuyere for detecting the gas flow through each ordinary tuyere,
(2) average flow calculating means to which said plurality of flow detecting means are connected for calculating the average flow through the ordinary tuyeres,
(3) a plurality of variation detecting means adapted to be coupled one to each ordinary tuyere for detecting variations of the flow through each ordinary tuyere from the calculated average, said variation detecting means being coupled to said average flow calculating means,
(4) a plurality of pulsating valves adapted to be mounted one in each auxiliary tuyere, each valve having a driving means,
(5) a plurality of control means coupled one to each driving means,
(6) a plurality of timer means coupled one to each control means for operating said control means periodically,
(7) a plurality of pairing means for actuating pairs of said control means in sequence and for changing the pairs of control means actuated from a first group of pairs to a second group of pairs which is different from the first group of pairs, said pairing means being coupled to said control means,
(8) a plurality of limit detecting means adapted to be coupled one to each ordinary tuyere for detecting when the flow in each ordinary tuyere reaches a variation from said calculated average corresponding to preset limits,
(9) by-passing control means for actuating said pairing means to bypass the actuation of pairs of said control means when the said limit detecting means detects a flow in an ordinary tuyere which is above the said preset limit from said calculated average, said by-passing control means being coupled between said plurality of limit detecting means and said plurality of pairing means,
(10) selective operating means for selectively operating at least one pair of auxiliary tuyeres lying on opposite sides of an ordinary tuyere when the flow in at least one ordinary tuyere is below the preset lower limit from said calculated average, said selective operating means being coupled between said plurality of limit detecting means and said plurality of pairing means, and
(11) memorizing, selecting and sequential starting means for selectively operating sets of auxiliary tuyeres on opposite sides of ordinary tuyeres when the flows of gas through a plurality of ordinary tuyeres is below the preset lower limit of said calculated average, said memorizing, selecting and sequential starting means being coupled between said plurality of limit detecting means and said plurality of pairing means.

3. An apparatus for use with a blast furnace having ordinary tuyeres and auxiliary tuyeres, said apparatus being for automatically controlling the flow of gas through the ordinary tuyeres and the auxiliary tuyeres, said apparatus comprising
(1) a plurality of electron tube type gas flow detectors adapted to be coupled one to each ordinary tuyere for detecting gas flow through each ordinary tuyere,
(2) an average flow calculating circuit to which said plurality of flow detectors are connected for calculating the average flow through the ordinary tuyeres,
(3) a plurality of variation detecting circuits adapted to be coupled one to each ordinary tuyere for detecting variations in the flow through each ordinary tuyere from the calculated average, said variation detecting circuits being coupled to said average flow calculating circuit,
(4) a plurality of pulsating valves adapted to be mounted one in each auxiliary tuyere, each valve having a driving means,
(5) a plurality of electromagnetic control switches coupled one to each valve driving means for controlling the drive of said valves,
(6) a plurality of timer means coupled to said electromagnetic control switches for opening and closing said switches,
(7) a plurality of pairing circuits for actuating pairs of said electromagnetic control switches in sequence and for changing the pairs of control switches actuated from a first group of pairs to a second group of pairs which is different from the first group of pairs, said pairing means being coupled to said control switches,
(8) a plurality of limit switch circuits adapted to be coupled one to each ordinary tuyere for detecting when the flow in each ordinary tuyere reaches a variation from said calculated average which corresponds to preset limits,
(9) a by-passing control circuit for actuating said pairing circuits to bypass the actuation of pairs of said control switches when the limit switch circuits detect a flow in an ordinary tuyere which is above the said preset limit from said calculated average, said by-passing control circuit being coupled between said plurality of limit switch circuits and said plurality of pairing circuits, and
(10) a selective operating relay circuit for selectively operating at least one pair of auxiliary tuyeres lying on opposite sides of an ordinary tuyere when the flow in at least one ordinary tuyere is below the preset lower limit from said calculated average, said selective operating relay circuit being coupled between said plurality of limit switch circuits and said plurality of pairing circuits.

4. An apparatus for use with a blast furnace having ordinary tuyeres and auxiliary tuyeres, said apparatus being for automatically controlling the flow of gas through the ordinary tuyeres and the auxiliary tuyeres, said apparatus comprising
(1) a plurality of electron tube type gas flow detectors adapted to be coupled one to each ordinary tuyere for detecting gas flow through each ordinary tuyere, (2) an average flow calculating circuit to which said plurality of flow detectors are connected for calculating the average flow through the ordinary tuyeres, (3) a plurality of variation detecting circuits adapted to be coupled one to each ordinary tuyere for detecting variations in the flow through each ordinary tuyere from the calculated average, said variation detecting circuits being coupled to said average flow calculating circuit, (4) a plurality of pulsating valves adapted to be mounted one in each auxiliary tuyere, each valve having a driving means, (5) a plurality of electromagnetic control switches coupled one to each valve driving means for controlling the drive of said valves, (6) a plurality of timer means coupled to said electromagnetic control switches for opening and closing said switches, (7) a plurality of pairing circuits for actuating pairs of said electromagnetic control switches in sequence and for changing the pairs of control switches actuated from a first group of pairs to a second group of pairs which is different from the first group of pairs, said pairing means being coupled to said control switches, (8) a plurality of limit switch circuits adapted to be coupled one to each ordinary tuyere for detecting when the flow in each ordinary tuyere reaches a variation from said calculated average which corresponds to preset limits, (9) a by-passing control circuit for actuating said pairing circuits to bypass the actuation of pairs of said control switches when the limit switch circuits detect a flow in an ordinary tuyere which is above the said preset limit from said calculated average, said by-passing control circuit being coupled between said plurality of limit switch circuits and said plurality of pairing circuits,

(10) a selective operating relay circuit for selectively operating at least one pair of auxiliary tuyeres lying on opposite sides of an ordinary tuyere when the flow in at least one ordinary tuyere is below the preset lower limit from said calculated average, said selective operating relay circuit being coupled between said plurality of limit switch circuits and said plurality of pairing circuits, and

(11) a memorizing, selecting and sequential starting circuit for selectively operating sets of auxiliary tuyeres on opposite sides of ordinary tuyeres when the flows of gas through a plurality of ordinary tuyeres is below the preset lower limit of said calculated average, said memorizing, selecting and sequential starting circuit being coupled between said plurality of limit switch circuits and said plurality of pairing circuits.

5. In combination a blast furnace having ordinary tuyeres and auxiliary tuyeres, and an apparatus being for automatically controlling the flow of gas through the ordinary tuyeres and the auxiliary tuyeres, said apparatus comprising (1) a plurality of flow detecting means coupled one to each ordinary tuyere for detecting the gas flow through each ordinary tuyere, (2) average flow calculating means to which said plurality of flow detecting means are connected for calculating the average flow through the ordinary tuyeres, (3) a plurality of variation detecting means coupled one to each ordinary tuyere for detecting variations of the flow through each ordinary tuyere from the calculated range, said variation detecting means being coupled to said average flow calculating means, (4) a plurality of pulsating valves mounted one in each auxiliary tuyere, each valve having a driving means, (5) a plurality of control means coupled one to each driving means, (6) a plurality of timer means coupled one to each control means for operating said control means periodically, (7) a plurality of pairing means for actuating pairs of said control means in sequence and for changing the pairs of control means actuated from a first group of pairs to a second group of pairs which is different from the first group of pairs, said pairing means being coupled to said control means, (8) a plurality of limit detecting means coupled one to each ordinary tuyere for detecting when the flow in each ordinary tuyere reaches a variation from said calculated average corresponding to preset limits, (9) by-passing control means for actuating said pairing means to bypass the actuation of pairs of said control means when the said limit detecting means detects a flow in an ordinary tuyere which is above the said preset limit from said calculated average, said by-passing control means being coupled between said plurality of limit detecting means and said plurality of pairing means, and

(10) selective operating means for selectively operating at least one pair of auxiliary tuyeres lying on opposite sides of an ordinary tuyere when the flow in at least one ordinary tuyere is below the preset lower limit from said calculated average, said selective operating means being coupled between said plurality of limit detecting means and said plurality of pairing means.

References Cited by the Examiner

UNITED STATES PATENTS

| | | | |
|---|---|---|---|
| 830,513 | 9/06 | Mannaberg | 266—30 |
| 1,260,660 | 3/18 | Gehrandt. | |
| 1,668,133 | 5/28 | Weichel et al. | 266—30 |
| 1,695,953 | 12/28 | Field | 75—41 |
| 2,879,056 | 3/59 | Wagner | 266—29 |

MORRIS O. WOLK, *Primary Examiner.*